US011647070B2

(12) United States Patent
Yang et al.

(10) Patent No.: US 11,647,070 B2
(45) Date of Patent: May 9, 2023

(54) FILE SENDING METHOD, FILE RECEIVING METHOD AND FILE TRANSCEIVING APPARATUS

(71) Applicant: ZTE CORPORATION, Guangdong (CN)

(72) Inventors: Hongzhang Yang, Guangdong (CN); Yaofeng Tu, Guangdong (CN); Guihai Chen, Guangdong (CN); Bin Guo, Guangdong (CN); Zhenjiang Huang, Guangdong (CN); Hong Gao, Guangdong (CN); Bingyang Li, Guangdong (CN); Junjie Jiang, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/260,996

(22) PCT Filed: Jul. 17, 2019

(86) PCT No.: PCT/CN2019/096324

§ 371 (c)(1),
(2) Date: Jan. 15, 2021

(87) PCT Pub. No.: WO2020/015670

PCT Pub. Date: Jan. 23, 2020

(65) Prior Publication Data

US 2021/0320965 A1 Oct. 14, 2021

(30) Foreign Application Priority Data

Jul. 20, 2018 (CN) ......................... 201810802828.7

(51) Int. Cl.
*H04L 67/06* (2022.01)
*H04L 67/1097* (2022.01)
(Continued)

(52) U.S. Cl.
CPC .......... *H04L 67/06* (2013.01); *H04L 67/1097* (2013.01); *H04L 67/561* (2022.05); *H04L 67/568* (2022.05)

(58) Field of Classification Search
CPC . H04L 67/06; H04L 67/1097; H04L 67/2804; H04L 67/2842; H04L 67/568; H04L 67/561
See application file for complete search history.

(56) References Cited

U.S. PATENT DOCUMENTS 6,748,441 B1 * 6/2004 Gemmell ................ H04L 67/06 714/752
2002/0018077 A1 * 2/2002 Powlette .................. G06F 9/54 715/744

(Continued)

FOREIGN PATENT DOCUMENTS

CN 107749893 A 3/2018

OTHER PUBLICATIONS

International search report of PCT Patent Application No. PCT/CN2019/096324 dated Oct. 15, 2019.

*Primary Examiner* — Wing F Chan
*Assistant Examiner* — Billy H Ng

(57) ABSTRACT

Provided are a file sending method, a file receiving method, and a file transceiving apparatus. The file sending method includes: creating a data sending process; acquiring a file to be sent, corresponding to the data sending process, from a data cache region in a user space; constructing metadata for the data sending process, and recording the metadata in a data reading and sending region in the user space; and sending the file to be sent and the metadata to a network adapter by means of a user-mode network device driver, and sending the file to be sent and the metadata by means of the network adapter.

9 Claims, 9 Drawing Sheets

(51) Int. Cl.
*H04L 67/561* (2022.01)
*H04L 67/568* (2022.01)

(56) References Cited

U.S. PATENT DOCUMENTS

| | | | | |
|---|---|---|---|---|
| 2002/0147827 | A1* | 10/2002 | Breiter | H04L 67/06 709/231 |
| 2003/0225835 | A1* | 12/2003 | Klien | H04L 67/42 709/205 |
| 2004/0010628 | A1* | 1/2004 | Gillam | H04L 67/42 709/250 |
| 2004/0153468 | A1* | 8/2004 | Paila | H04N 21/8543 |
| 2008/0146266 | A1* | 6/2008 | Sollenberger | H04L 67/06 455/550.1 |

* cited by examiner

| Comparison | | Copy | Context Switch | Interrupt |
|---|---|---|---|---|
| Traditional method | read/write system call | 2 | 4 | 3 |
| | mmap/write system call | 1 | 4 | 3 |
| | sendfile system call | 0.5 | 2 | 3 |
| Present disclosure | | 0 | 0 | 0 |

Fig. 3B

| Comparison | Copy | Context Switch | Interrupt |
|---|---|---|---|
| Traditional method | 2 | 4 | 2 |
| Present disclosure | 0 | 0 | 0 |

FILE SENDING METHOD, FILE RECEIVING METHOD AND FILE TRANSCEIVING APPARATUS

FIELD OF THE INVENTION

The present application relates to, but is not limited to, the field of communication technology.

BACKGROUND OF THE INVENTION

In recent years, new high-performance computing, storage, and networking hardware devices represented by embedded NPU (neural network processor), GPU (graphics processing unit), SSD (solid state disk), NVM (non-volatile memory), Infiniband (a "cable conversion" technique that supports multiple concurrent links), and 400 GbE (400G Ethernet) are experiencing rapid development; however, the development of software systems is stagnating. Therefore, software system delays account for an increasing proportion in remote data transmission.

SUMMARY OF THE INVENTION

According to an aspect of embodiments of the present disclosure, provided is a file sending method, including steps of: creating a data sending process; acquiring a file to be sent, corresponding to the data sending process, from a data cache region in a user space; constructing metadata for the data sending process, and recording same in a data reading and sending region in the user space; and processing the metadata, wherein the step of processing the metadata includes: sending the file to be sent and the metadata to a network adapter by means of a user-mode network device driver, and sending the file to be sent and the metadata by means of the network adapter.

According to another aspect of the embodiments of the present disclosure, provided is a file receiving method, including steps of: creating a data receiving process, and storing data of a file to be received in a data cache region in a user space; constructing metadata for the data receiving process, and recording same in a data receiving and writing region in the user space; and processing the metadata, wherein the step of processing the metadata includes: writing the file to be received, corresponding to the metadata, into an external memory by means of a user-mode storage device driver.

According to yet another aspect of the embodiments of the present disclosure, provided is a file transceiving apparatus, including a memory, a processor, and a file transceiving program stored on the memory and capable of running on the processor, wherein the file transceiving program, when executed by the processor, implements steps of the file sending method or file receiving method according to the embodiments of the present disclosure.

According to yet another aspect of the embodiments of the present disclosure, provided is a computer-readable storage medium having stored thereon a file transceiving program that, when executed by a processor, implements steps of the file sending method or file receiving method according to the embodiments of the present disclosure.

According to yet another aspect of the embodiments of the present disclosure, provided is a file transceiving apparatus, including a storage device data exchange region and a network device data exchange region, wherein the storage device data exchange region and the network device data exchange region have an overlapping region, the overlapping region including: a data reading and sending region configured to record metadata for a data sending process; a data receiving and writing region configured to record metadata for a data receiving process; and a data cache region configured to cache a file to be sent corresponding to the data sending process, and a file to be received corresponding to the data receiving process, wherein when the metadata for the data sending process is processed, the file corresponding to the data sending process is sent to a network adapter by means of a user-mode network device driver, and the file corresponding to the data sending process is sent by the network adapter; and when the metadata for the data receiving process is processed, the file corresponding to the data receiving process is written into an external memory by means of the user-mode storage device driver.

BRIEF DESCRIPTION OF THE DRAWINGS

FIG. 3B is another schematic diagram showing a comparison between a file sending method according to an embodiment of the present disclosure and traditional file sending methods.

DETAILED DESCRIPTION OF THE EMBODIMENTS

Figure 1:
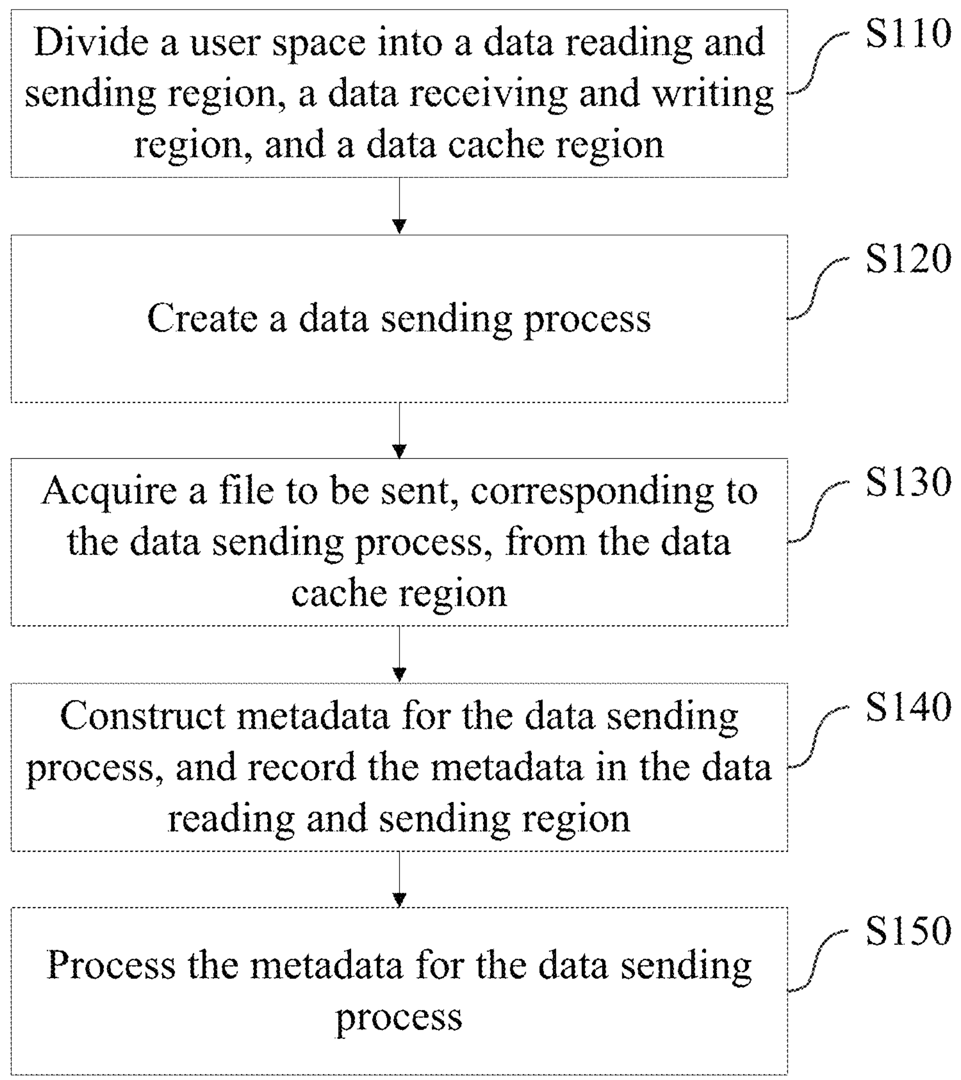
FIG. 1 is a flowchart of a file sending method according to an embodiment of the present disclosure.

The realization, functional characteristics and advantages of the objectives of the present disclosure will be further described in conjunction with embodiments and with reference to accompanying drawings.

It should be understood that the specific embodiments described herein are only used to explain the present disclosure, but not used to limit the present disclosure.

In recent years, new high-performance hardware devices are experiencing rapid development, but software systems are stagnating. Therefore, software system delays account for an increasing proportion in remote data transmission. Generally, performance loss of a software system is mainly caused by the following three aspects.

(1) Copy (also called replication). A copy operation will cause data redundancy as well as delays and central processing unit (CPU) overheads. Copy is divided into two types, one being copy of metadata, and the other being copy of data. The cost of the former is smaller, while the cost of the latter is larger. Generally, the reason for unnecessary copy is that different operations correspond to different memory regions.

(2) Context switch. Context switch refers to the transition of a process between a kernel mode and a user mode, which will cause delays. System call refers to a service that a process running in a user space requests a higher running priority from an operating system kernel, and it is a typical operation that causes context switches. At the beginning of a system call, a context switch from user space to kernel space will be caused. At the end of a system call, a context switch from kernel space to user space will be caused.

(3) Interrupt. When a CPU is executing a program, if an event occurs in a system, the CPU will suspend the program being executed, save the scene when the program is interrupted, automatically transfer to the corresponding event, and return to the interrupt point to continue to complete the interrupted program after the event has been processed. Typically, an interrupt is generated when a read operation by a direct memory access (DMA) external memory ends. Typically, in a scenario where multiple clients send files to a same receiving end in high concurrency, the CPU at the receiving end is constantly busy with interrupts, repeatedly saving scenes, and there are relatively few opportunities for real data processing, thus leading to serious delays.

In the process of file sending and receiving, a large number of copies, context switches, and interrupts will be generated, causing delays in software systems.

Therefore, the present disclosure particularly provides a file sending method, a file receiving method, and a file transceiving apparatus, which basically avoid one or more of the problems caused by the limitations and restrictions of related technologies.

In the following description of the present disclosure, suffixes such as "module", "component" or "unit" used to indicate elements are only for facilitating the description of the present disclosure, and have no special meaning themselves. Therefore, terms "module", "component" and "unit" can be used interchangeably.

FIG. 1 is a flowchart of a file sending method according to an embodiment of the present disclosure. As shown in FIG. 1, in some embodiments, the file sending method may include step S110 to step S150.

In step S110, a user space is divided into a data reading and sending region, a data receiving and writing region, and a data cache region.

In the embodiment of the present disclosure, in the file sending method, only the user space for the process is used, while a kernel space for the process is not used. File data reading and writing, as well as file data receiving and sending via a network, are completed in a user mode in the whole process without involvement of the kernel, and thus no context switch is required.

In step S120, a data sending process is created.

In step S130, a file to be sent, corresponding to the data sending process, is acquired from the data cache region.

In step S140, metadata for the data sending process is constructed and recorded in the data reading and sending region.

In the embodiment of the present disclosure, the metadata for the data sending process is not limited, and the metadata only needs to be able to accurately describe the file and the behavior of sending the file.

In step S150, the metadata for the data sending process is processed. Processing the metadata may include: transmitting the metadata to a user-mode network device driver; and sending the file to be sent and the metadata to a network adapter by means of the user-mode network device driver, and sending the file to be sent and the metadata by means of the network adapter.

In the embodiment of the present disclosure, the two consecutive operations of reading and sending are concentrated in the same region, so there is no need to copy data or metadata in different memory regions.

According to the file sending method of the embodiment of the present disclosure, the kernel is completely bypassed, significantly reducing copies, context switches, and interrupts, thereby significantly improving the performance of a software system.

Figure 2:
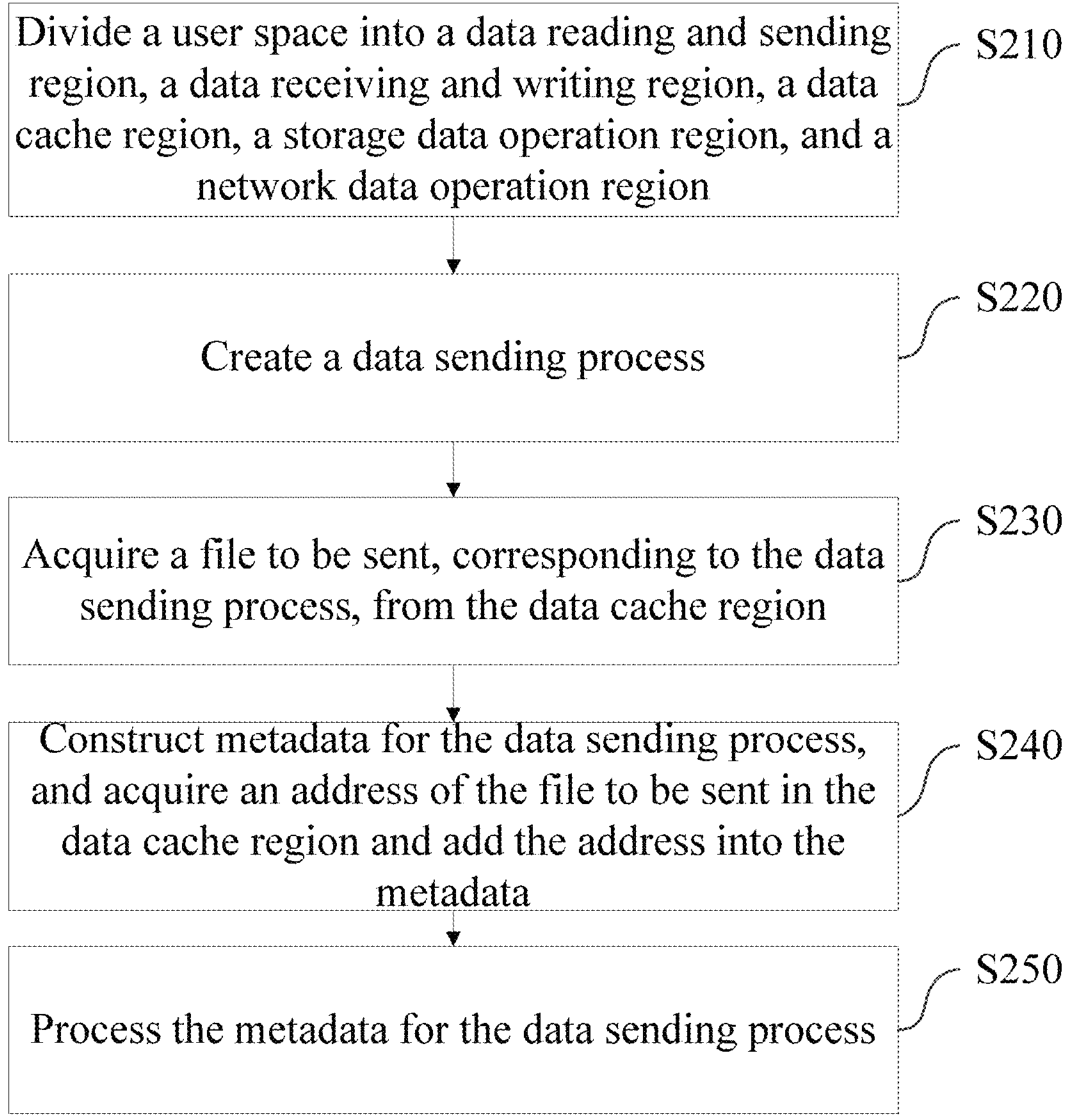
FIG. 2 is another flowchart of a file receiving method according to an embodiment of the present disclosure.

FIG. 2 is another flowchart of a file sending method according to an embodiment of the present disclosure. As shown in FIG. 2, in some embodiments, the file sending method may include step S210 to step S250.

In step S210, a user space is divided into a data reading and sending region, a data receiving and writing region, a data cache region, a storage data operation region, and a network data operation region.

In step S220, a data sending process is created.

In the embodiment of the present disclosure, a user at a sending end transmits, to the data sending process, information, such as an identifier "file_id" of a file to be sent, an identifier "receive_socket" of a receiving end host, a starting position offset "offset", and a length "length".

In step S230, a file to be sent, corresponding to the data sending process, is acquired from the data cache region.

In the embodiment of the present disclosure, if the file to be sent cannot be acquired from the data cache region, the file to be sent is read from an external memory by means of a user-mode storage device driver, or the file to be sent is acquired from the storage data operation region and/or the network data operation region, and the file to be sent is stored in the data cache region.

In the embodiment of the present disclosure, the data sending process checks whether data of the file to be sent exists in an internal memory. In implementation, the data sending process checks whether data of the file to be sent exists in the data cache region, the storage data operation region, and the network data operation region. If not, the data is read by means of a user-mode storage device driver. The data with a starting position "offset" and a length "length" in the file "file_id" is read from an external memory, and this process is performed in a polling manner. Finally, the data is stored in the data cache region, and a memory address of the data is recorded as "senddata_addr". If so, step S240 is directly executed.

In step S240, metadata for the data sending process is constructed, and an address of the file to be sent in the data cache region is acquired and added into the metadata.

In the embodiment of the present disclosure, constructing the metadata for the data sending process may include: recording the metadata for the data sending process in the data reading and sending region. The content of the metadata may include: a sending serial number "send_no", the identifier "file_id" of the file to be sent, an identifier "send_socket" of the sending end host, an identifier "receive_socket" of the receiving end host, the starting position offset "offset", the length "length", the memory address "senddata_addr" of the data of the file to be sent, and a sending time "timestamp".

In step S250, the metadata for the data sending process is processed. Processing the metadata may include: transmitting the metadata to a user-mode network device driver; and sending the file to be sent and the metadata to a network adapter by means of the user-mode network device driver, and sending the file to be sent and the metadata by means of the network adapter.

In the embodiment of the present disclosure, the metadata is transmitted to the user-mode network device driver; the data, with the memory address "senddata_addr" and the length "length", of the file to be sent, as well as the metadata, is transmitted to the network adapter by means of the user-mode network device driver; then the metadata and the data of the file to be sent are sent to the receiving end host "receive_socket"; finally, the metadata for the data sending process is deleted in the data reading and sending region.

In the embodiment of the present disclosure, after the metadata for the data sending process is processed, if feedback of a success from the receiving end is received, the sending process ends; if feedback of a failure is received or a timeout occurs, the user is notified that the sending process has failed.

In the embodiment of the present disclosure, if multiple metadata to be processed exist in the data reading and sending region, the multiple metadata to be processed are processed sequentially.

Figure 3A:
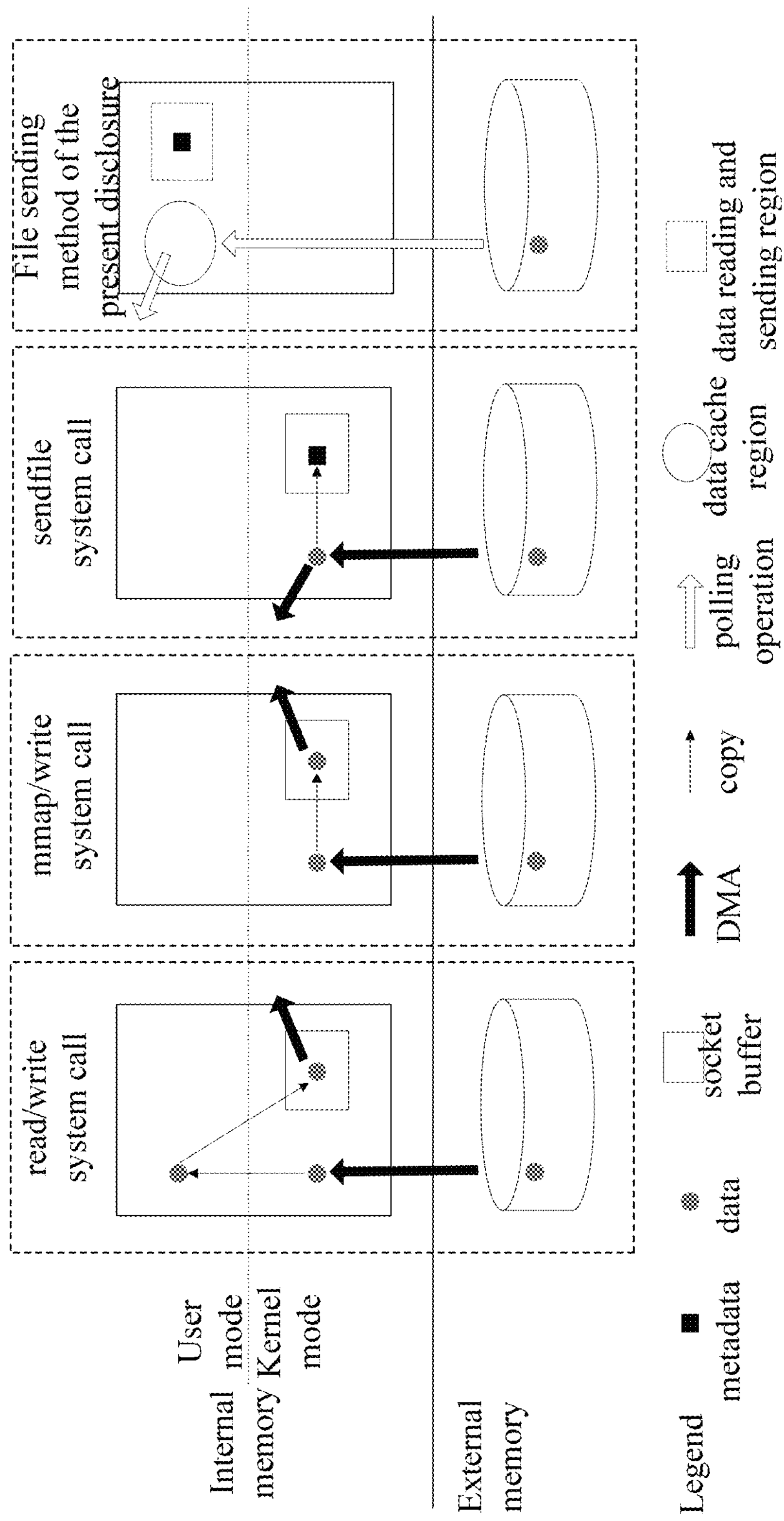
FIG. 3A is a schematic diagram showing a comparison between a file sending method according to an embodiment of the present disclosure and traditional file sending methods.

FIG. 3A is a schematic diagram showing a comparison between a file sending method according to an embodiment of the present disclosure and traditional file sending methods. FIG. 3B is another schematic diagram showing a comparison between a file sending method according to an embodiment of the present disclosure and traditional file sending methods.

As shown in FIGS. 3A and 3B, a typical process of transmitting a local file to a remote host via a network is taken as an example. There are three traditional sending methods, namely, read/write system call, mmap/write system call, and sendfile system call. In FIG. 3A, the memory may be, for example, a DRAM (dynamic random access memory), and the external memory may be, for example, an SSD.

(1) read/write system call. A read system call causes a first context switch between user space and kernel space. A DMA module reads the content of a file from a disk and stores same in a buffer of the kernel space, causing a first interrupt. Data is copied from the buffer of the kernel space to a buffer of the user space, completing a first copy. Then the read system call returns, causing a second context switch between the user space and the kernel space. A write system call causes a third context switch between the user space and the kernel space. Data is copied from the buffer of the user space to a specific buffer in the kernel space related to a socket (port) used, completing a second copy. Then the write system call returns, causing a fourth context switch between the user space and the kernel space and generating a second interrupt. Finally, the DMA module asynchronously transmits the data from the buffer of the kernel space to a protocol engine, causing a third interrupt.

(2) mmap/write system call. A mmap system call causes the content of a file to be copied into a kernel buffer by using a DMA module, and the buffer is then shared with a user process, so that the copy between the kernel buffer and a user buffer will not occur. Therefore, compared with read system call, one copy process is reduced by mmap system call.

(3) sendfile system call. A sendfile system call "sendfile (socket, file, and length)" causes a first context switch between user space and kernel space. A DMA module reads the content of a file from a disk and stores same in a buffer of the kernel space, causing a first interrupt. Subsequently, a descriptor that records the location and length of data is added into a socket buffer. Since only metadata is copied but no data is copied, this causes 0.5 copies. Then the sendfile system call returns, causing a second context switch between the user space and the kernel space and generating a second interrupt. The DMA module transmits the data directly from the kernel buffer to a protocol engine, causing a third interrupt.

According to the three traditional file sending methods described above, significant performance loss is caused due to copies, context switches, and interrupts. The root cause is that, a user process cannot complete all the reading and sending operations in a user mode, but has to rely on or even be restricted by the kernel.

According to the file sending method provided in the embodiment of the present disclosure, it only needs to write file data into a cache region and then into an internal memory by means of a polling operation, without involvement of any context switch, copy, or interrupt. The file sending method provided in the embodiment of the present disclosure bypasses the kernel, and also bypasses copies, context switches, and interrupts involved in the traditional sending methods, greatly improving data sending efficiency.

Figure 4:
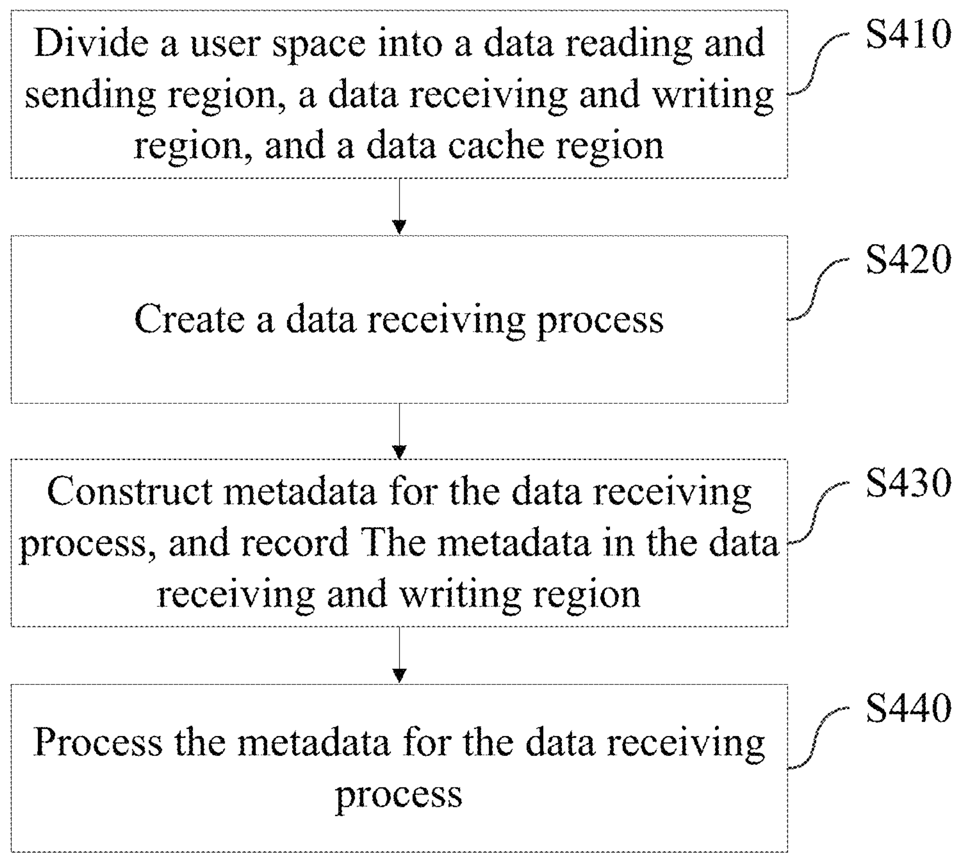
FIG. 4 is a flowchart of a file receiving method according to an embodiment of the present disclosure.

FIG. 4 is a flowchart of a file receiving method according to an embodiment of the present disclosure. As shown in FIG. 4, in some embodiments, the file receiving method may include step S410-step S440.

In step S410, a user space is divided into a data reading and sending region, a data receiving and writing region, and a data cache region.

In the embodiment of the present disclosure, according to the file receiving method, only the user space for the process needs to be used, while the kernel space for the process does not need to be used. The receiving operation via a network, as well as the data writing operation, is completed in a user mode in the whole process without involvement of the kernel, and thus no context switch is required.

In step S420, a data receiving process is created.

In the embodiment of the present disclosure, creating the data receiving process may include: receiving data of a file to be received, from a network adapter by means of a user-mode network device driver and in a polling manner; storing, in the data cache region, the received data of the file to be received; and recording, as "receivedata_addr", a memory address of the received data of the file to be received.

In step S430, metadata for the data receiving process is constructed, and is recorded in the data receiving and writing region.

In the embodiment of the present disclosure, the metadata for the data receiving process is not limited, and the metadata only needs to be able to accurately describe the file and the behavior of receiving the file.

In step S440, the metadata for the data receiving process is processed. Processing the metadata may include: writing the file to be received, corresponding to the metadata, into an external memory by means of the user-mode storage device driver.

In the embodiment of the present disclosure, if multiple metadata to be processed exist in the data receiving and writing region, the multiple metadata to be processed are processed sequentially.

In the embodiment of the present disclosure, the two consecutive operations of receiving and writing are concentrated in the same region, so there is no need to copy data or metadata in different memory regions.

According to the file receiving method of the embodiment of the present disclosure, the kernel is completely bypassed, significantly reducing copies, context switches, and interrupts, significantly improving the performance of a software system.

Figure 5:
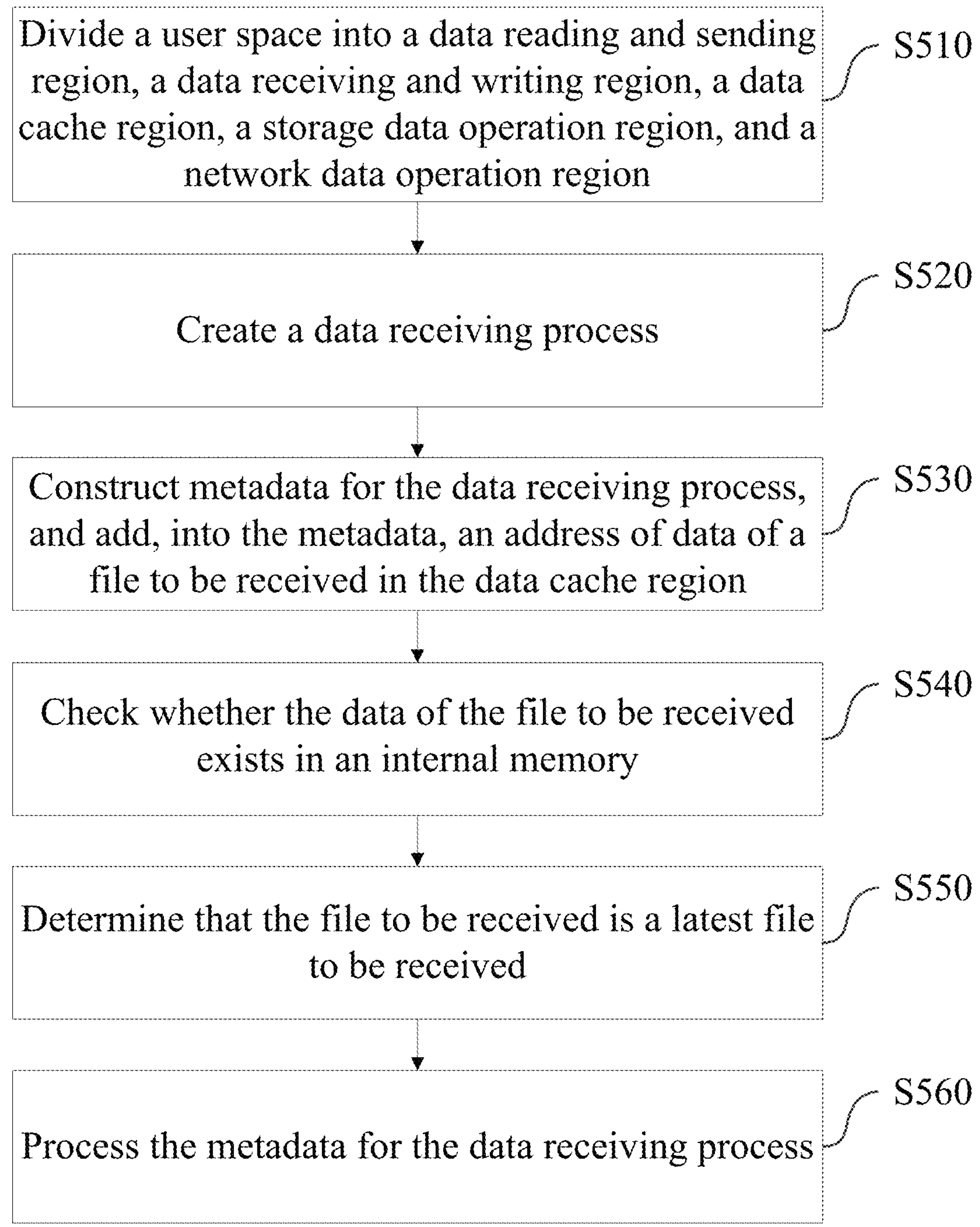
FIG. 5 is another flowchart of a file receiving method according to an embodiment of the present disclosure.

FIG. 5 is another flowchart of a file receiving method according to an embodiment of the present disclosure. As shown in FIG. 5, in some embodiments, the file receiving method may include step S510 to step S560.

In step S510, a user space is divided into a data reading and sending region, a data receiving and writing region, a data cache region, a storage data operation region, and a network data operation region.

In step S520, a data receiving process is created.

In the embodiment of the present disclosure, creating the data receiving process may include: receiving data of a file to be received, from a network adapter by means of a user-mode network device driver and in a polling manner; storing, in the data cache region, the received data of the file to be received; and recording, as "receivedata_addr", a memory address of the received data of the file to be received.

In step S530, metadata for the data receiving process is constructed, and an address of the data of the file to be received in the data cache region is added into the metadata.

In the embodiment of the present disclosure, constructing the metadata for the data receiving process may include: recording the metadata for the data receiving process in the data receiving and writing region. The content of the metadata may include: a receiving serial number "send_no", an identifier "file_id" of the file to be written, an identifier "send_socket" of a sending end host, an identifier "receive_socket" of a receiving end host, a starting position offset "offset", a length "length", the memory address "receivedata_addr" of the data of the file to be received, and a sending time "timestamp".

In step S540, it is checked whether the data of the file to be received exists in an internal memory.

In the embodiment of the present disclosure, the data receiving process checks whether the data of the file to be received exists in the data cache region, the storage data operation region, and the network data operation region. If so, step 550 is executed to confirm that the file to be received is the latest. If not, step 560 is executed.

In step S550, it is confirmed that the file to be received is the latest file to be received.

In the embodiment of the present disclosure, confirming that the file to be received is the latest file to be received may include: comparing a timestamp of a same file that has already existed in the internal memory with a timestamp for the data receiving process; and if the timestamp for the data receiving process is nearest to the current time, confirming that the file to be received is the latest file to be received, and executing step S560; otherwise, providing a feedback to the sending end that content has expired, and deleting the data in the memory address "receivedata_addr".

In step S560, the metadata for the data receiving process is processed. Processing the metadata may include: writing the file to be received, corresponding to the metadata, into an external memory by means of the user-mode storage device driver.

In the embodiment of the present disclosure, writing the file to be received, corresponding to the metadata, into the external memory by means of the user-mode storage device driver may include: writing the data with the memory address "receivedata_addr" and the length "length" into the file "file_id" in the external memory by means of the user-mode storage device driver, and then deleting the metadata for this data receiving process in the data receiving and writing region. The data receiving process feeds back the situation of this reception to the sending end by means of the user-mode network device driver. If this reception succeeds, a success is fed back to the sending end. If this reception fails, a failure and reasons for the failure are fed back to the sending end.

In the embodiment of the present disclosure, if multiple metadata to be processed exist in the data receiving and writing region, the multiple metadata to be processed are processed sequentially.

Figures 6A, 6B:
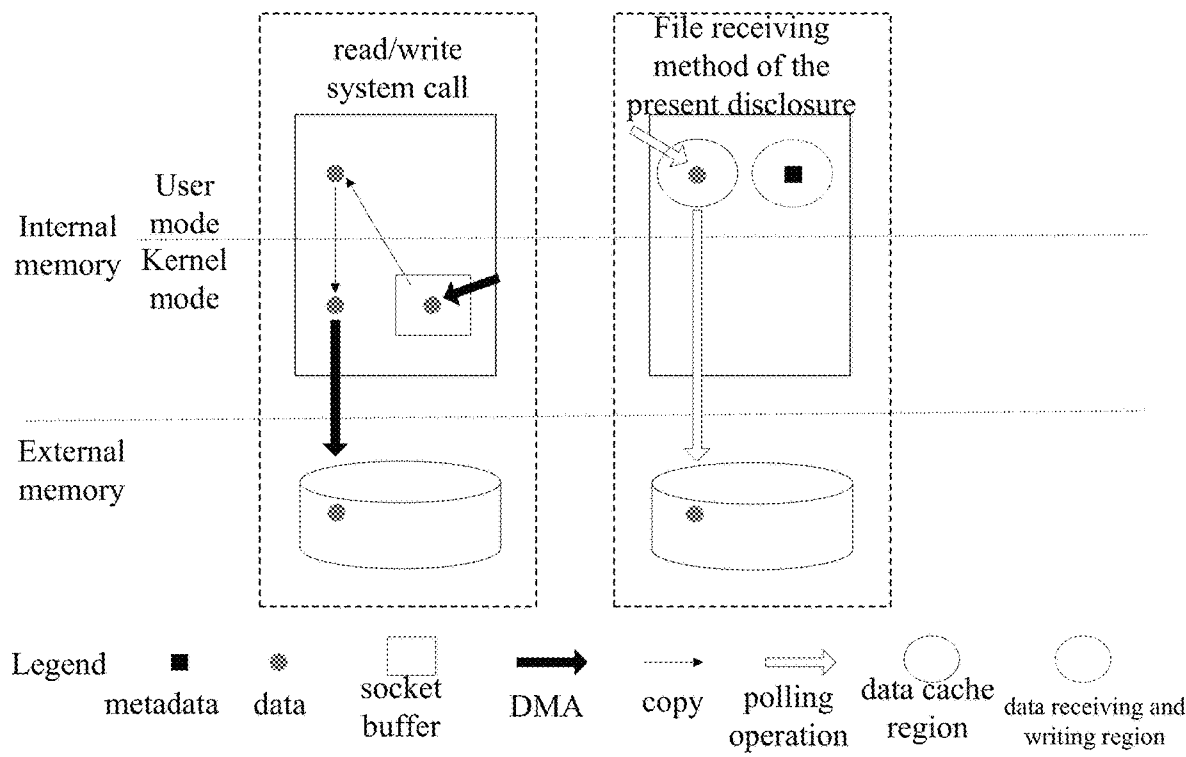
FIG. 6A is a schematic diagram showing a comparison between a file receiving method according to an embodiment of the present disclosure and a traditional file receiving method.
FIG. 6B is another schematic diagram showing a comparison between a file receiving method according to an embodiment of the present disclosure and a traditional file receiving method.

FIG. 6A is a schematic diagram showing a comparison between a file receiving method according to an embodiment of the present disclosure and a traditional file receiving method. FIG. 6B is another schematic diagram showing a comparison between the file receiving method according to an embodiment of the present disclosure and a traditional file receiving method.

As shown in FIGS. 6A and 6B, there are a few researches and improvements on reception in related technologies, and the traditional method is a reverse process of the sending process performed by means of a read/write system call. That is, when a file is transmitted to a receiving end, a first interrupt is generated. The DMA module transmits data from the protocol engine to the socket buffer of the kernel space. A read system call causes a first context switch between the user space and the kernel space. Data is copied from the socket buffer of the kernel space to the buffer of the user space, completing a first copy. Then the read system call returns, causing a second context switch between the kernel space and the user space. A write system call causes a third context switch between the user space and the kernel space. Data is copied from the buffer of the user space to the buffer of the kernel space, completing a second copy. Then the write system call returns, causing a fourth context switch between the kernel space and the user space. Finally, the DMA module writes the data into the external memory, generating a second interrupt.

According to the file receiving method provided in the embodiment of the present disclosure, it only needs to write file data into a cache region by means of a polling operation and then send the file data to an external memory, without involvement of any context switch, copy, or interrupt. The file receiving method provided in the embodiment of the present disclosure bypasses the kernel, and also bypasses copies, context switches, and interrupts involved in the traditional sending method, greatly improving data receiving efficiency.

Figure 7:
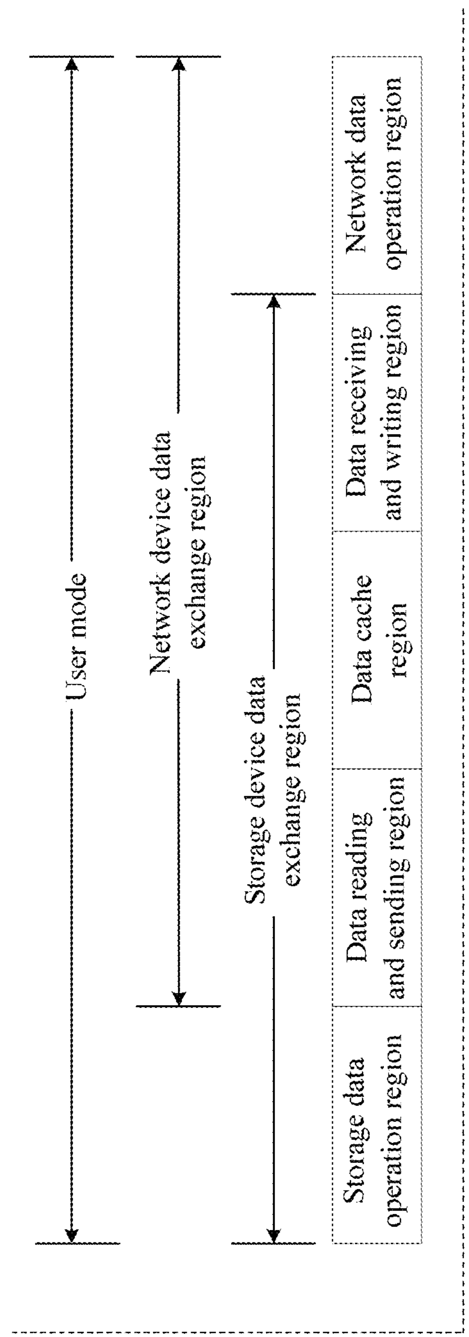
FIG. 7 is a schematic diagram of a file transceiving apparatus according to an embodiment of the present disclosure.

FIG. 7 is a schematic diagram of a file transceiving apparatus according to an embodiment of the present disclosure. As shown in FIG. 7, in some embodiments, the file transceiving apparatus may include a storage device data exchange region and a network device data exchange region, the storage device data exchange region and the network device data exchange region having an overlapping region.

The overlapping region of the storage device data exchange region and the network device data exchange region may include a data reading and sending region, a data receiving and writing region, and a data cache region. The data reading and sending region may be configured to record metadata for a data sending process. The data receiving and writing region may be configured to record metadata for a data receiving process. The data cache region may be configured to cache a file to be sent corresponding to the data sending process, and a file to be received corresponding to the data receiving process. When the metadata for the data sending process is processed, a user-mode network device driver sends the file corresponding to the data sending process to a network adapter, and said file is sent by the network adapter. When the metadata for the data receiving process is processed, the user-mode storage device driver writes the file corresponding to the data receiving process into an external memory.

In the embodiment of the present disclosure, the storage device data exchange region and the network device data exchange region also have non-overlapping regions. A storage data operation region located only in the storage device data exchange region may be configured to store files that are not to be sent to the network. A network data operation region located only in the network device data exchange region may be configured to store files that are not to be written into the external memory.

According to an embodiment of the present disclosure, the file transceiving apparatus may include a module A and a module B.

In the embodiment of the present disclosure, the module A is a storage device data exchange region. This region is configured for data exchange between a user-mode storage device driver and a user memory. That is, data in an external memory may be read into the module A (the storage device data exchange region) by means of a user-mode storage device driver, and data in the module A (the storage device data exchange region) may be written into an external memory. The module A (the storage device data exchange region) provides support for polling user-mode storage device drivers. This region mainly includes a storage data operation region, a data reading and sending region, a data receiving and writing region, and a data cache region.

In the embodiment of the present disclosure, the module B is a network device data exchange region. This region is configured for data exchange between a user-mode network device driver and a user memory. That is, data in a network adapter may be received in the module B (the network device data exchange region) by means of a user-mode network device driver, and data in the module B (the network device data exchange region) may be sent to a network adapter. The module B (the network device data exchange region) provides support for polling user-mode network device drivers. This region mainly includes a network data operation region, the data reading and sending region, the data receiving and writing region, and the data cache region.

In the embodiment of the present disclosure, an overlapping region of the module A and the module B may include a module C, a module D, and a module E.

In the embodiment of the present disclosure, the module C is the data reading and sending region. This region is configured as a link to concentrate the processing of two consecutive operations of data reading and sending in the same region, thereby reducing copy of data in different regions. When sending a file, the module C (the data reading and sending region) is configured to store metadata to be sent and then process same sequentially.

In the embodiment of the present disclosure, the module D is the data receiving and writing region. This region is configured as a link to concentrate the processing of two consecutive operations of data receiving and writing in the same region, thereby reducing copy of data in different regions. When receiving a file, the module D (the data receiving and writing region) is configured to store only metadata to be written and then process same sequentially.

In the embodiment of the present disclosure, the module E is the data cache region. This region is configured to store data. Data to be sent and data to be written are stored in this region. After sending or writing, the data still exist in the internal memory, so that hot data will be directly provided in the internal memory when it is to be sent or written next time, avoiding disk reading or data transmission across the network. Besides, the structure in which metadata and data are separated further simplifies management.

In the embodiment of the present disclosure, non-overlapping regions of the module A and the module B may include a module F located only in the module A, and a module G located only in the module B.

In the embodiment of the present disclosure, the module F is the storage data operation region. Not all read data need to be sent, so the module F (the storage data operation region) is configured to process non-network transmission data.

In the embodiment of the present disclosure, the module G is the network data operation region. Not all data received from the network adapter need to be written into the external memory, so the module G (the network data operation region) is configured to process data that is not to be written into the external memory.

Figure 8:
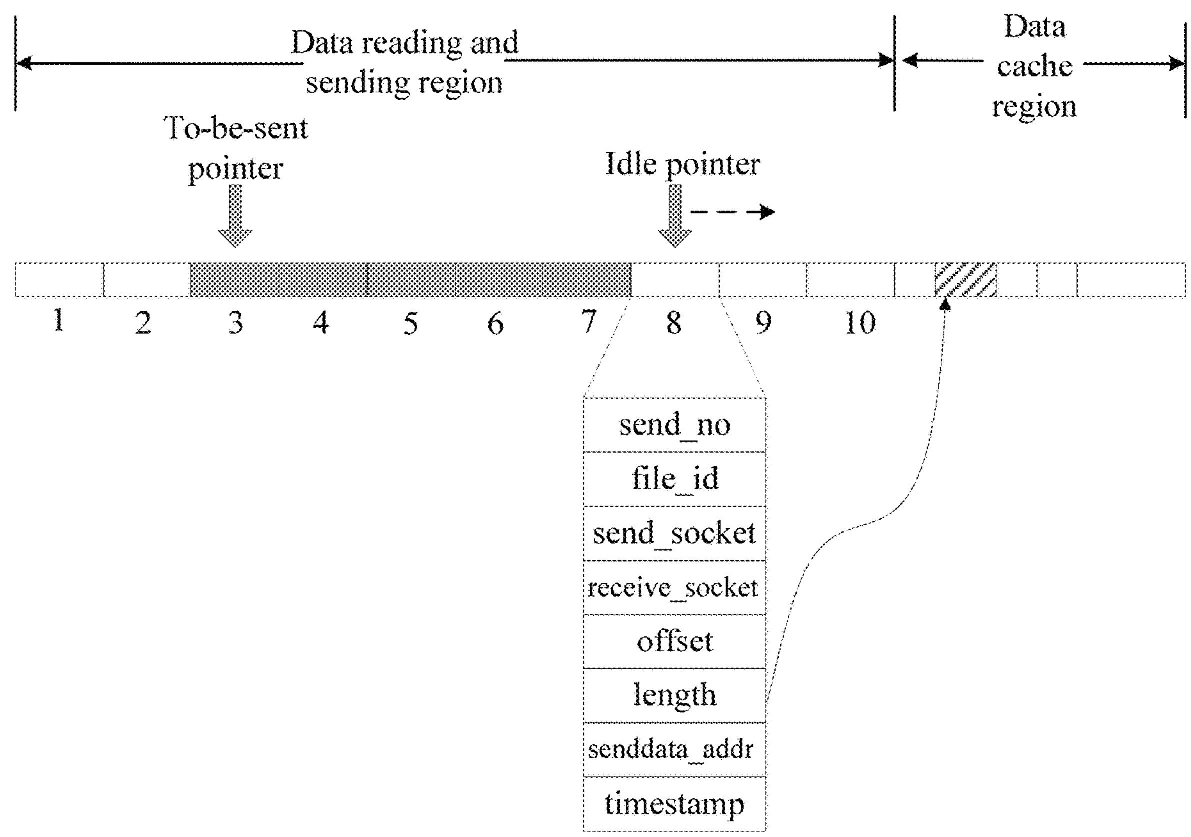
FIG. 8 is another schematic diagram of a file transceiving apparatus according to an embodiment of the present disclosure.

FIG. 8 is another schematic diagram of a file transceiving apparatus according to an embodiment of the present disclosure. The implementation of the file transceiving method provided in the embodiments of the present disclosure will be described in further detail below with reference to FIG. 8.

A user file sending interface function is user_sendfile (file_id, receive_socket, offset, and length). A user file receiving interface function is user_receivefile ( ).

The size of a data reading and sending region is 1280 KB and the size of metadata for each sending process is 128 KB, so this region can accommodate ten sending processes at a time. Ten segments are set in the data reading and sending region, and each segment contains one piece of metadata for a sending process. Initially, a to-be-sent pointer is set to null, and an idle pointer is set to point to segment 1. The segments are allocated sequentially, and the sending processes are also processed sequentially. In FIG. 8, transmission metadata have been put into seven segments, and the transmission metadata in the first two segments have been processed. Therefore, the to-be-sent pointer currently points to segment 3, and the idle pointer currently points to segment 8. The structure of the data receiving and writing region is the same as the structure of the data reading and sending region described above, and thus will not be repeated here.

A file transceiving process may include the following steps.

(1) Host user B with number 1101 calls the user-mode interface function user_receivefile ( ), polls a network adapter by means of a user-mode network device driver, and is always ready to receive file data.

(2) Host user A with number 1111 needs to send, to host user B with number 1101, data starting from the 64th byte and having a length of 808 bytes (hereinafter referred to as "data to be sent") in a file /etc/inetd.conf with number 2323. User A calls the user-mode interface function user_sendfile (2323, 1101, 64, 808).

(3) A data sending process of host user A checks whether the data to be sent already exists in the data cache region, the storage data operation region, and the network data operation region, and the answer is no.

(4) The data sending process of host user A reads the data to be sent, from an external memory by means of the user-mode storage device driver and in a polling manner. 808 bytes are taken up in the data cache region to store the data to be sent, and the memory address of the data to be sent is 0x00157ff0.

(5) The data sending process of host user A writes metadata, currently to be sent, into segment 8 to which the idle pointer points, in the data reading and sending region. The metadata includes: sending serial number 8, identifier 2323 of the file to be sent, sending end host identifier 1111, receiving host identifier 1101, start position 64, length 808, memory address 0x00157ff0 of the data to be sent, sending time 20180428120211. The idle pointer is modified to point to segment 9.

(6) The data sending process of host user A sequentially processes the metadata to be sent, in the data reading and sending region. Metadata to be sent, corresponding to segment 3, is being currently processed. As time goes by, the to-be-sent pointer points to segment 8. At this time, the sending process sends the data with the memory address of 0x00157ff0 and the length of 808 bytes to the host with number 1101 by means of the user-mode network device driver and in a polling manner. The to-be-sent pointer points to segment 9, and the content for segment 8 is deleted.

(7) A data receiving process of host user B receives, in the network adapter, the data sent by user A. 808 bytes are taken up in the data cache region to store the data, and the memory address of the data is 0x0c8899f0.

(8) The data receiving process of host user B writes metadata for the receiving process into segment 1 to which the idle pointer points, in the data receiving and writing region. The metadata includes: receiving serial number 123, identifier 2323 of the file to be written, sending end host identifier 1111, receiving end host identifier 1101, starting position 64, length 808, memory address 0x0c8899f0 of the data to be written, and sending time 20180428120211. The idle pointer is modified to point to segment 2.

(9) The data receiving process of the host user B checks whether the data of the file to be received exists in the data cache region, the storage data operation region, and the network data operation region, and the answer is no.

(10) The data receiving process of host user B processes segment 1 in the data receiving and writing region. The data with the memory address 0x0c8899f0 and the length of 808 bytes is written into the file /etc/inetd.conf in the external memory by means of the user-mode storage device driver. Then the metadata for segment 1 is deleted in the data receiving and writing region.

(11) The result of successful reception by the data receiving process of the host user B is fed back to user A of sending end host 1111 by means of the user-mode network device driver.

(12) The data sending process of user A of host 1111 receives feedback of a success from the receiving end, and the current file data sending process ends.

Those skilled in the art can understand that all or some of the steps in the method and functional modules/units in the system and apparatus disclosed above can be implemented as software, firmware, hardware, and appropriate combinations thereof. In hardware implementations, the division of functional modules/units mentioned in the above description does not necessarily correspond to the division of physical components. For example, a physical component may have multiple functions, or a function or step may be performed by several physical components in cooperation. Some or all physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, and the computer-readable medium may include a computer storage medium (or a non-transitory medium) and a communication medium (or a transitory medium). As is well known to those of ordinary skill in the art, the term "computer storage medium" includes volatile and nonvolatile, removable and non-removable media implemented in any method or technology for storage of information (such as computer-readable instructions, data structures, program modules, or other data). Computer storage media include but are not limited to RAM, ROM, EEPROM, flash memory, 3Dxpoint or other memory technology, CD-ROM, digital versatile disk (DVD) or other optical disk storage, magnetic cassette, tape, magnetic disk storage or other magnetic storage devices, or any other medium that can be used to store desired information and that can be accessed by a computer. In addition, as is well known to those of ordinary skill in the art, communication media typically embody computer readable instructions, data structures, program modules or other data in a modulated data signal such as a carrier wave or other transport mechanism and may include any information delivery media.

The embodiments of the present disclosure are described above with reference to the accompanying drawings, but the present disclosure is not limited to the above embodiments. The above embodiments are merely illustrative and not restrictive. With the inspiration from the present disclosure, those of ordinary skill in the art can make many forms without departing from the purpose of the present disclosure and the scope of protection of the claims, and all these forms fall within the scope of protection of the present disclosure.

The invention claimed is:

1. A file sending method, comprising steps of:

dividing a user space of a memory into a data reading and sending region, a data receiving and writing region, and a data cache region, wherein the data reading and sending region is configured to correspond a process related to a data reading and sending operation, the data receiving and writing region is configured to correspond a process related to a data receiving and writing operation, and the data cache region is configured to store data to be sent and received;

creating a data sending process;

acquiring a file to be sent, corresponding to the data sending process, from the data cache region in the user space;

constructing metadata for the data sending process, and recording the metadata in the data reading and sending region in the user space; and processing the metadata, wherein the step of processing the metadata comprises:

performing, by the data sending process, processes sequentially on the metadata in the data reading and sending region; and sending the file to be sent and the metadata to a network adapter by a user-mode network device driver, and sending the file to be sent and the metadata by the network adapter.

2. The method according to claim 1, before the step of acquiring a file to be sent, corresponding to the data sending process, from a data cache region, the method comprising steps of:

reading the file to be sent, from an external memory by a user-mode storage device driver, in response to determining that the file to be sent is not capable of being acquired from the data cache region; and storing the file to be sent in the data cache region.

3. The method according to claim 1, wherein the step of constructing metadata for the data sending process comprises a step of:

adding, into the metadata, an address of the file to be sent in the data cache region.

4. The method according to claim 1, wherein the step of dividing the user space into the data reading and sending region, a data receiving and writing region, and the data cache region further comprises steps of:

dividing the user space into a storage data operation region and a network data operation region, and wherein before the step of acquiring the file to be sent, corresponding to the data sending process, from the data cache region, the method further comprises steps of:

acquiring the file to be sent, from the storage data operation region and the network data operation region, in response to determining that the file to be sent is not capable of being acquired from the data cache region; and storing the file to be sent in the data cache region.

5. A file receiving method, comprising steps of:

dividing a user space of a memory into a data reading and sending region, a data receiving and writing region, and a data cache region, wherein the data reading and sending region is configured to correspond a process related to a data reading and sending operation, the data receiving and writing region is configured to correspond a process related to a data receiving and writing operation, and the data cache region is configured to store data to be sent and received;

creating a data receiving process, and storing data of a file to be received in a data cache region in the user space;

constructing metadata for the data receiving process, and recording the metadata in the data receiving and writing region in the user space; and processing the metadata, wherein the step of processing the metadata comprises:

performing, by the data receiving process, processes sequentially on the metadata in the data receiving and writing region; and writing the file to be received, corresponding to the metadata, into an external memory by a user-mode storage device driver.

6. The method according to claim 5, wherein the step of creating a data receiving process and storing data of a file to be received in a data cache region comprises steps of:

receiving the data of the file to be received, from a network adapter by a user-mode network device and in a polling manner; and storing the data of the file to be received in the data cache region.

7. The method according to claim 5, wherein the step of constructing metadata for the data receiving process comprises a step of:

adding, into the metadata, an address of the file to be received in the data cache region.

8. The method according to claim 5, wherein the step of dividing the user space into a data reading and sending region, the data receiving and writing region, and the data cache region further comprises steps of:

dividing the user space into a storage data operation region and a network data operation region, and wherein before the step of processing the metadata, the method further comprises a step of:

determining that the data of the file to be received does not exist in the data cache region, the storage data operation region, and the network data operation region; or determining that the data of the file to be received exists in the data cache region, the storage data operation region or the network data operation region, and the file to be received is a latest file to be received.

9. A file sending and receiving apparatus, comprising a memory, a processor, and a file sending program stored on the memory and capable of running on the processor, wherein the file sending program, when executed by the processor, implements steps of:

dividing a user space of a memory into a data reading and sending region, a data receiving and writing region, and a data cache region, wherein the data reading and sending region is configured to correspond a process related to a data reading and sending operation, the data receiving and writing region is configured to correspond a process related to a data receiving and writing operation, and the data cache region is configured to store data to be sent and received;

creating a data sending process;

acquiring a file to be sent, corresponding to the data sending process, from the data cache region in the user space;

constructing metadata for the data sending process, and recording the metadata in a data reading and sending region in the user space; and processing the metadata, wherein the step of processing the metadata comprises:

performing, by the data sending process, processes sequentially on the metadata in the data reading and sending region; and sending the file to be sent and the metadata to a network adapter by a user-mode network device driver, and sending the file to be sent and the metadata by the network adapter;

and the file sending and receiving apparatus further comprises a file receiving program stored on the memory and capable of running on the processor, wherein the file receiving program, when executed by the processor, implements steps of:

creating a data receiving process, and storing data of a file to be received in the data cache region in the user space;

constructing metadata for the data receiving process, and recording the metadata in a data receiving and writing region in the user space; and processing the metadata, wherein the step of processing the metadata comprises:

performing, by the data receiving process, processes sequentially on the metadata in the data receiving and writing region; and writing the file to be received, corresponding to the metadata, into an external memory by a user-mode storage device driver.

* * * * *